United States Patent
Toyama et al.

(10) Patent No.: US 10,741,372 B2
(45) Date of Patent: Aug. 11, 2020

(54) TANDEM MASS SPECTROMETER AND PROGRAM FOR THE SAME

(71) Applicant: SHIMADZU CORPORATION, Kyoto-shi, Kyoto (JP)

(72) Inventors: Atsuhiko Toyama, Kyoto (JP); Hideki Yamamoto, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 16/480,489

(22) PCT Filed: Feb. 28, 2018

(86) PCT No.: PCT/JP2018/007423
§ 371 (c)(1),
(2) Date: Jul. 24, 2019

(87) PCT Pub. No.: WO2018/163926
PCT Pub. Date: Sep. 13, 2018

(65) Prior Publication Data
US 2020/0013599 A1 Jan. 9, 2020

(30) Foreign Application Priority Data
Mar. 6, 2017 (JP) .................................. 2017-041372

(51) Int. Cl.
*H01J 49/00* (2006.01)
*H01J 49/06* (2006.01)
(Continued)

(52) U.S. Cl.
CPC .......... *H01J 49/004* (2013.01); *H01J 49/062* (2013.01); *H01J 49/165* (2013.01); *H01J 49/40* (2013.01); *H01J 49/4215* (2013.01)

(58) Field of Classification Search
USPC .................................................. 250/281, 282
See application file for complete search history.

(56) References Cited

U.S. PATENT DOCUMENTS 8,017,908 B2    9/2011    Gorenstein et al.
8,809,770 B2    8/2014    Bonner et al.
(Continued)

FOREIGN PATENT DOCUMENTS

CA    2810473 A1    3/2012
CN    103109345 A    5/2013
(Continued)

OTHER PUBLICATIONS

Communication dated Feb. 4, 2020 from Japanese Patent Office in JP Application No. 2019-504502.
(Continued)

*Primary Examiner* — Kiet T Nguyen
(74) *Attorney, Agent, or Firm* — Sughrue Mion, PLLC

(57) ABSTRACT

As soon as a set of data is acquired by a mass spectrometric analysis, an accumulated value of the signal intensity on the mass spectrum is calculated for each m/z segment obtained by dividing the entire m/z range covered by the measurement by a predetermined m/z width. Only the m/z segments with accumulated signal-intensity values equal to or greater than a predetermined threshold are selected as the target for an MS/MS analysis. MS/MS analysis is performed for each selected m/z segment, using ions whose m/z values fall within the m/z segment as precursor ions. A measurement cycle which includes mass spectrometric analysis performed one time and MS/MS analysis performed one or more times is repeated. After that, ions originating from the same component are selected based on the retention time of a peak in an extracted ion chromatogram created for each product ion, and the component is identified.

3 Claims, 4 Drawing Sheets

(51) Int. Cl.
*H01J 49/16* (2006.01)
*H01J 49/40* (2006.01)
*H01J 49/42* (2006.01)

(56) References Cited

U.S. PATENT DOCUMENTS

| | | | |
|---|---|---|---|
| 2007/0278395 | A1 | 12/2007 | Gorenstein et al. |
| 2007/0284520 | A1 | 12/2007 | Yamamoto |
| 2010/0187414 | A1 | 7/2010 | Gorenstein et al. |
| 2013/0206979 | A1 | 8/2013 | Bonner et al. |
| 2013/0289893 | A1* | 10/2013 | Kawase ............. H01J 49/0036 702/23 |
| 2015/0144778 | A1 | 5/2015 | Bonner et al. |
| 2015/0279644 | A1 | 10/2015 | Bonner et al. |
| 2015/0287579 | A1 | 10/2015 | Bonner et al. |
| 2016/0225594 | A1 | 8/2016 | Bonner et al. |
| 2016/0329197 | A1 | 11/2016 | Yamaguchi |
| 2017/0032948 | A1 | 2/2017 | Bonner et al. |
| 2017/0328874 | A1* | 11/2017 | Yamamoto ......... G01N 30/8644 |
| 2018/0224406 | A1* | 8/2018 | Xuan ................. G01N 30/8675 |
| 2018/0240658 | A1* | 8/2018 | Cox ................... H01J 49/0027 |

FOREIGN PATENT DOCUMENTS

| | | |
|---|---|---|
| CN | 105917220 A | 8/2016 |
| CN | 106055895 A | 10/2016 |
| EP | 1 749 272 A2 | 2/2007 |
| EP | 2 617 052 A1 | 7/2013 |
| EP | 3 096 135 A1 | 11/2016 |
| GB | 2 430 489 A | 3/2007 |
| JP | 2005-536728 A | 12/2005 |
| JP | 2007-527992 A | 10/2007 |
| JP | 2007-309661 A | 11/2007 |
| JP | 2008-298427 A | 12/2008 |
| JP | 2013-537312 A | 9/2013 |
| JP | 2015-222275 A | 12/2015 |
| WO | 2004/019035 A2 | 3/2004 |
| WO | 2005/079263 A2 | 9/2005 |
| WO | 2012/035412 A2 | 3/2012 |
| WO | 2015/107642 A1 | 7/2015 |

OTHER PUBLICATIONS

International Search Report for PCT/JP2018/007423 dated Apr. 10, 2018 (PCT/ISA/210).
Written Opinion for PCT/JP2018/007423 dated Apr. 10, 2018 (PCT/ISA/237).

* cited by examiner

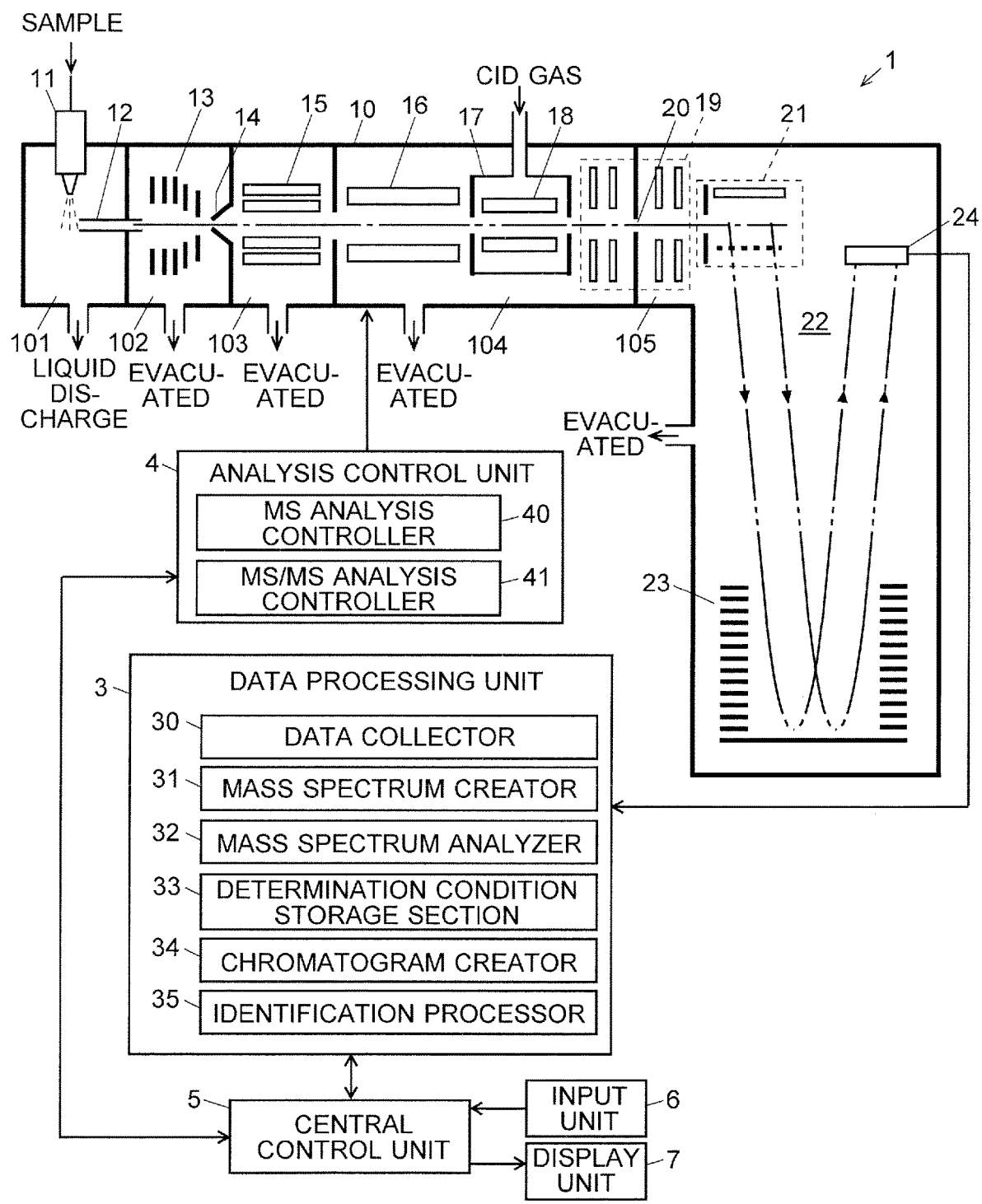

Fig. 4A
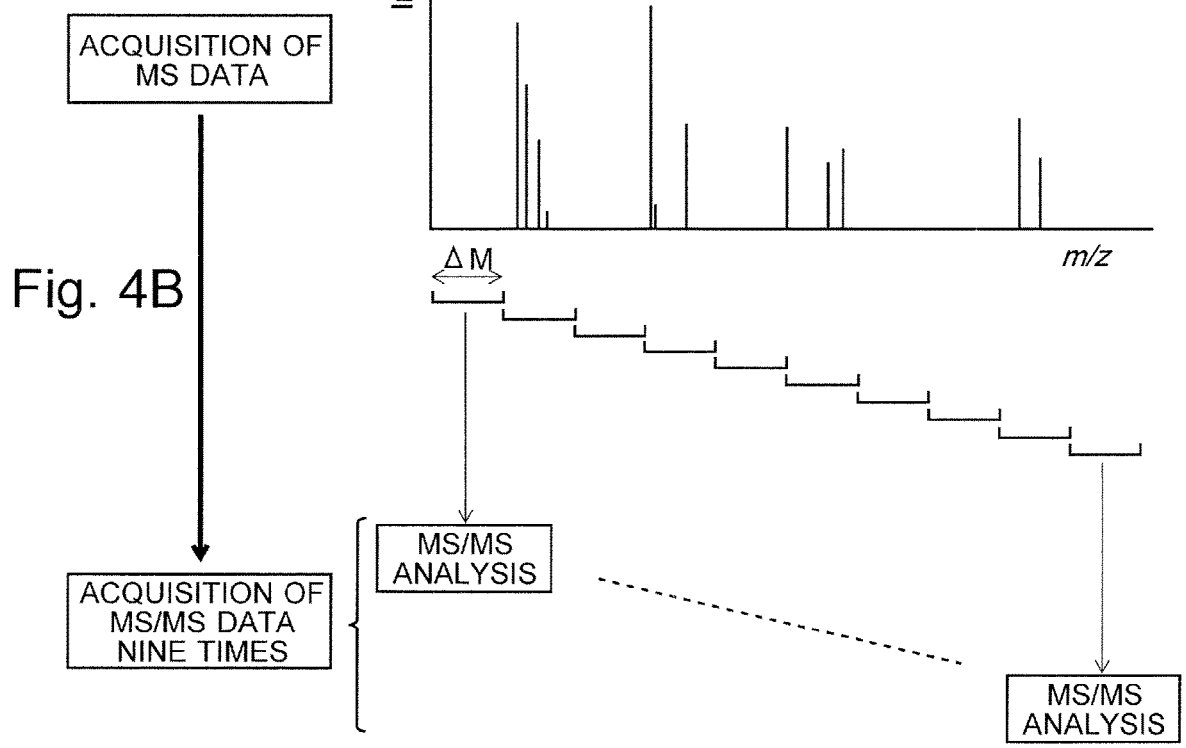
Fig. 4B
Fig. 5A
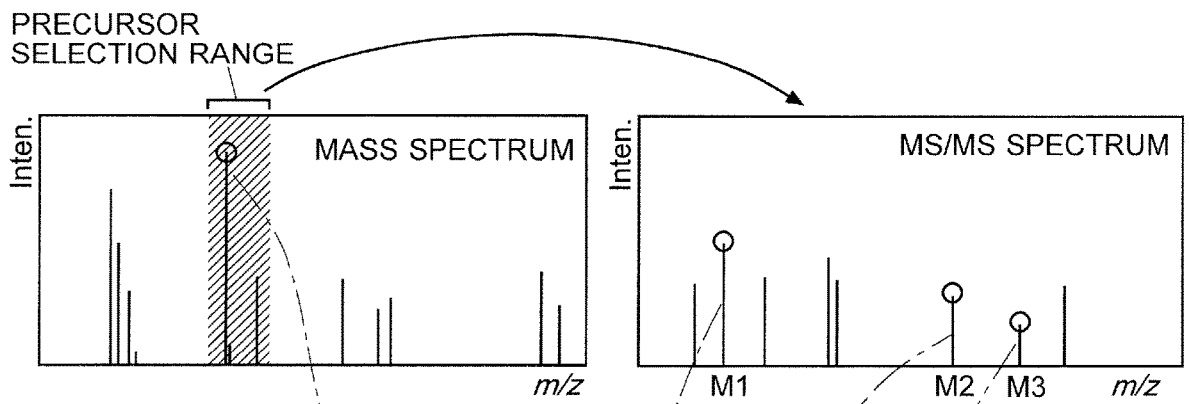
Fig. 5B
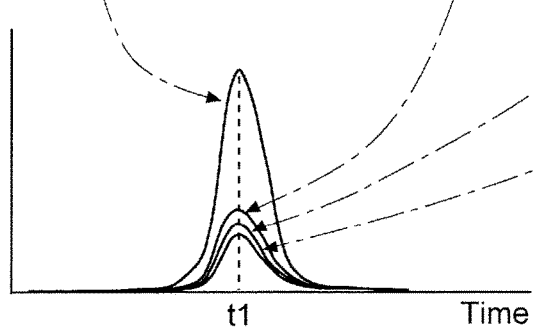

TANDEM MASS SPECTROMETER AND PROGRAM FOR THE SAME

CROSS REFERENCE TO RELATED APPLICATIONS

This application is a National Stage of International Application No. PCT/JP2018/007423 filed Feb. 28, 2018, claiming priority based on Japanese Patent Application No. 2017-041372 filed Mar. 6, 2017.

TECHNICAL FIELD

The present invention relates to a tandem mass spectrometer capable of dissociating an ion originating from a sample and performing a mass spectrometric analysis of the product ions (fragment ions) produced by the dissociation. The present invention also relates to a computer program for such a mass spectrometer.

BACKGROUND ART

MS/MS analysis (tandem analysis), which is a type of mass spectrometric technique, is a useful technique for identifying compounds having high molecular weights or analyzing their chemical structures. In recent years, the technique has been widely used in various areas. A commonly known type of mass spectrometer for MS/MS analysis is a triple quadrupole mass spectrometer including a collision cell for performing collision induced dissociation (CID) sandwiched between mass filters located on the front and rear sides of the cell. A so-called "Q-TOF" mass spectrometer, which includes a time-of-flight mass analyzer in place of the rear mass filter in the triple quadrupole mass spectrometer, is structurally more complex and expensive than the triple quadrupole mass spectrometer, but has the advantage that it can acquire more accurate mass spectra. A TOF/TOF type of device in which the front quadrupole mass filter is also replaced by a time-of-flight mass analyzer has also been known.

In the present description, any type of mass spectrometer which can perform an MS/MS analysis by having a configuration including an ion-dissociating section for dissociating ions (which is not limited to a collision cell) sandwiched between front and rear mass analyzers is generally called a tandem mass spectrometer. The tandem mass spectrometer may hereinafter be simply referred to as a mass spectrometer.

Mass spectrometers, which are not limited to tandem mass spectrometers, are often used in combination with liquid chromatographs (LC) or gas chromatographs (GC). In particular, a liquid chromatograph mass spectrometer (LC-MS) or gas chromatograph mass spectrometer (GC-MS), which includes a tandem mass spectrometer combined with a liquid chromatograph or gas chromatograph, is useful for simultaneous multicomponent analysis in which a large number of compounds contained in a sample are simultaneously analyzed. These types of devices are hereinafter collectively called the "chromatograph mass spectrometer".

When an MS/MS spectrum for a specific component in a sample is to be acquired with a chromatograph mass spectrometer, it is normally necessary to previously set, as one of the analyzing conditions, the mass-to-charge ratio m/z of a precursor ion originating that specific component as the target. Understandably, in the case of acquiring information concerning an unknown component contained in a sample, it is impossible to previously set the mass-to-charge ratio of the precursor ion as one of the analyzing conditions.

A data-acquisition technique for solving the previously described problem in the MS/MS analysis is disclosed in Patent Literature 1. This technique is hereinafter schematically described using FIGS. 4A, 4B, 5A and 5B.

In a mass spectrometer, a normal mass spectrometric analysis which includes no ion-dissociating operation is repeatedly performed at predetermined intervals of time. FIG. 4A is a mass spectrum obtained by one mass spectrometric analysis. Within the period of time from the completion of one execution of a mass spectrometric analysis to the next execution of the same mass spectrometric analysis, an MS/MS analysis is performed for each of the mass-to-charge-ratio sections defined by dividing the entire mass-to-charge-ratio range by a predetermined mass-to-charge-ratio width $\Delta M$, as shown in FIG. 4B. In the example of FIG. 4B, since the entire mass-to-charge-ratio range is divided into ten sections, the MS/MS analysis is performed ten times for each execution of the normal mass spectrometric That is to say, one normal mass spectrometric analysis and ten subsequent MS/MS analyses constitute one measurement cycle. Through the repetition of this measurement cycle, mass spectrum data and MS/MS spectrum data are accumulated. For example, in the method described in Patent Literature 1, the mass-to-charge-ratio width $\Delta M$ mentioned earlier is set to be equal to or greater than 15 amu. The width $\Delta M$ can be appropriately determined according to the breadth of the entire mass-to-charge-ratio range to be covered by the measurement as well as the width with which the precursor ion can be accurately filtered at the stage prior to the CID.

As can be understood from FIGS. 4A and 4B, the number of ion species included within the mass-to-charge-ratio width $\Delta M$ can vary with the section; there may be one kind of ion or multiple kinds of ions, or in some cases, there may be no ion included within the mass-to-charge-ratio width $\Delta M$. Regardless of such a variation, the MS/MS analysis is always performed in such a manner that all ion species included within the mass-to-charge-ratio width $\Delta M$ are collectively designated as precursor ions. FIG. 5A shows one example of the MS/MS spectrum. If ion species originating from different components are collectively designated as precursor ions in the MS/MS analysis, the product ions originating from those different components will appear in a mixed form on the MS/MS spectrum. On such an MS/MS spectrum, it is almost impossible to determine, for each product ion, which component is the origin of that product ion.

After the completion of the measurement, the mass spectra and MS/MS spectra sequentially obtained with the passage of time are analyzed to identify the compounds contained in the sample. For example, in the method described in Patent Literature 1, an extracted ion chromatogram (which is conventionally called the "mass chromatogram") corresponding to the mass-to-charge ratio of a peak in an MS/MS spectrum of each compound is created from the measurement data, based on a collection of MS/MS spectra (spectrum library) previously obtained for known compounds. Whether or not the compound is present is determined with reference to an index which shows the degree of matching of the created extracted ion chromatogram with a pattern which is predicted from the spectrum library.

On the other hand, in a method described in Patent Literature 2, peaks (mass peaks) are detected from the mass spectra and MS/MS spectra sequentially obtained with the passage of time, and an extracted ion chromatogram is created for each of the mass-to-charge ratios of those peaks. The precursor ion and product ions originating from the same component have their respective peaks (chromatogram peaks) at the same retention time on the extracted ion chromatograms. Accordingly, as shown in FIG. 5B, the precursor ion and product ions located at the same retention time are collected, and the mass information of those ions are compared with a compound database to identify the precursor ion, i.e. the original component. In the example of FIGS. 5A and 5B, the original component is identified from the precursor ion and three product ions (m/z=M1, M2 and M3) having the same retention time t1.

In any of the previously described techniques, an exhaustive MS/MS analysis for various kinds of ion peaks observed on a mass spectrum is preformed, rather than an MS/MS analysis in which a specific ion peak observed on a mass spectrum is designated as the target. Therefore, various components contained in a sample can be almost completely identified. Those techniques also allow for a quantitative analysis based on the area of a peak in an extracted ion chromatogram.

In the previously described techniques, the retention time of the peak on the created extracted ion chromatogram (chromatogram peak) is an important index for identifying the precursor ion. Accordingly, in order to improve the accuracy of the identification of the precursor ion, it is necessary to improve the correctness of the retention time of the chromatogram peak. To this end, it is necessary to increase the number of data points forming the peak on the extracted chromatogram. Increasing the number of data points forming a peak is also essential for improving the accuracy of the peak shape in a quantitative analysis based on the area of a peak on an extracted ion chromatogram.

The number of data points per unit time decreases with an increase in the length of time of one measurement cycle. Therefore, for example, if the mass-to-charge-ratio width $\Delta M$ is constantly maintained, increasing the number of times of the execution of the MS/MS analysis to widen the entire mass-to-charge-ratio range to be covered by the measurement will decrease the number of data points per unit time. Similarly, setting a narrower mass-to-charge-ratio width $\Delta M$ to decrease the number of target components in one MS/MS analysis will also increase the number of times of the execution of the MS/MS analysis and consequently decrease the number of data points per unit time.

As one technique for increasing the number of data points per unit time, for example, if the rear mass analyzer is a quadrupole mass filter, the control sequence may be modified so as to increase the scan rate of the voltages applied to the electrodes forming the filter and thereby shorten the time required for one execution of the MS/MS analysis. If the rear mass analyzer is a time-of-flight mass analyzer, the control sequence may be modified so as to increase the amount of acceleration energy for ejecting ions into the flight space and thereby shorten the time required for one execution of the MS/MS analysis. However, those methods may possibly lower the sensitivity or reproducibility of the MS/MS spectrum to be eventually obtained. It is therefore difficult to create an extracted ion chromatogram with a high level of quality.

CITATION LIST

Patent Literature

Patent Literature 1: U.S. Pat. No. 8,809,770 B
Patent Literature 2: U.S. Pat. No. 8,017,908 B
Patent Literature 3: JP 2007-309661 A
Patent Literature 4: JP 2008-298427 A

SUMMARY OF INVENTION

Technical Problem

The present invention has been developed to solve the previously described problem. One of its objectives is to provide a tandem mass spectrometer in which an exhaustive MS/MS analysis for various kinds of ion peaks observed on a mass spectrum can be performed in such a manner that the number of times of the execution of an MS/MS analysis can be decreased to ensure a high level of measurement sensitivity and reproducibility, while the length of time of one measurement cycle can be shortened to increase the number of data points per unit time in the extracted ion chromatogram. Another objective is to provide a computer program for such a mass spectrometer.

Solution to Problem

The tandem mass spectrometer according to the present invention developed for solving the previously described problem is a tandem mass spectrometer including a first mass-separating section configured to select, as a precursor ion, an ion having a specific mass-to-charge ratio or ions having a specific mass-to-charge-ratio range among ions originating from a sample, an ion-dissociating section configured to dissociate the precursor ion, and a second mass-separating section configured to perform a mass spectrometric analysis for various product ions generated by dissociation of the precursor ion, the tandem mass spectrometer further including:

a) a mass spectrometry controller configured to control each of the aforementioned sections so as to acquire mass spectrum data by performing a mass spectrometric analysis in the second mass-separating section, without performing the selection of an ion in the first mass-separating section and the dissociation of an ion in the ion-dissociating section;

b) a mass-to-charge-ratio segment determiner configured to select one or more mass-to-charge-ratio segments from a plurality of mass-to-charge-ratio segments obtained by dividing an entire mass-to-charge-ratio range covered by a measurement by a predetermined mass-to-charge-ratio width, and/or to combine two or more mass-to-charge-ratio segments neighboring each other among the plurality of mass-to-charge-ratio segments to form a mass-to-charge-ratio segment having a larger mass-to-charge-ratio width, based on mass spectrum data obtained under a control of the mass spectrometry controller; and c) an MS/MS analysis controller configured to control each of the aforementioned sections after acquisition of the mass spectrum data under the control of the mass spectrometry controller and determination of the one or more mass-to-charge-ratio segments by the mass-to-charge-ratio segment determiner, so as to acquire MS/MS spectrum data for each of the determined mass-to-charge-ratio segment or segments by performing a mass spectrometric analysis in the second mass-separating section after selecting an ion whose mass-to-charge ratio falls within the mass-to-charge-ratio segment in the first mass-separating section and dissociating the selected ion in the ion-dissociating section.

A program for a tandem mass spectrometer according to the present invention developed tier solving the previously described problem is a program for computer for controlling an operation of a tandem mass spectrometer including a first mass-separating section configured to select, as a precursor ion, an ion having a specific mass-to-charge ratio or ions having a specific mass-to-charge-ratio range among ions originating from a sample, an ion-dissociating section configured to dissociate the precursor ion, and a second mass-separating section configured to perform a mass spectrometric analysis for various product ions generated by dissociation of the precursor ion, the program configured to make the computer function as:

a) a mass spectrometry control functional unit configured to control each of the aforementioned sections so as to acquire mass spectrum data by performing a mass spectrometric analysis in the second mass-separating section, without performing the selection of an ion in the first mass-separating section and the dissociation of an ion in the ion-dissociating section;

b) a mass-to-charge-ratio segment determination functional unit configured to select one or more mass-to-charge-ratio segments from a plurality of mass-to-charge-ratio segments obtained by dividing an entire mass-to-charge-ratio range covered by a measurement by a predetermined mass-to-charge-ratio width, and/or to combine two or more mass-to-charge-ratio segments neighboring each other among the plurality of mass-to-charge-ratio segments to form a mass-to-charge-ratio segment having a larger mass-to-charge-ratio width, based on mass spectrum data obtained under a control of the mass spectrometry control functional unit; and c) an MS/MS analysis control functional unit configured to control each of the aforementioned sections after acquisition of the mass spectrum data under the control of the mass spectrometry control functional unit and determination of the one or more mass-to-charge-ratio segments by the mass-to-charge-ratio segment determination functional unit, so as to acquire MS/MS spectrum data for each of the determined mass-to-charge-ratio segment or segments by performing a mass spectrometric analysis in the second mass-separating section after selecting an ion whose mass-to-charge ratio falls within the mass-to-charge-ratio segment in the first mass-separating section and dissociating the selected ion in the ion-dissociating section.

In the tandem mass spectrometer according to the present invention, the techniques for the mass separation in the first mass-separating section and the second mass-separating section are not specifically limited. As a typical example, a quadrupole mass filter or time-of-flight mass separator may be used as the first mass-separating section and the second mass-separating section, respectively. The technique for the ion dissociation in the ion-dissociating section is also not specifically limited. For example, collision-induced dissociation may be used.

In the tandem mass spectrometer according to the present invention, the mass spectrometry controller acquires mass spectrum data over a predetermined mass-to-charge-ratio range by controlling the previously mentioned sections so as to perform a normal mass spectrometric analysis in which neither the selection of an ion in the first mass-separating section nor the dissociation of an ion in the ion-dissociating section is performed. As soon as the mass spectrum data is acquired, the mass-to-charge-ratio segment determiner determines the mass-to-charge-ratio segments for which the MS/MS analysis should be performed, based on the mass spectrum data.

Specifically, the mass-to-charge-ratio segment determiner determines one or more mass-to-charge-ratio segments for which the MS/MS analysis should be performed. This is achieved by selecting one or more mass-to-charge-ratio segments which are considered to be significant among a plurality of mass-to-charge-ratio segments obtained by dividing the entire mass-to-charge-ratio range covered by a measurement by a predetermined mass-to-charge-ratio width, or by combining two or more mass-to-charge-ratio segments neighboring each other among the plurality of mass-to-charge-ratio segments to form a mass-to-charge-ratio segment having a larger mass-to-charge-ratio width, or by performing both of the two aforementioned operations. The mass-to-charge-ratio width should preferably be wider than approximately 10 Da, in some cases, it may be as broad as tens of Da or even greater. It is preferable to allow operators (users) to manually set the mass-to-charge-ratio width.

A mass-to-charge-ratio segment which is "considered to be significant" is typically a segment in which there is a precursor ion from which product ions with sufficiently high intensities for detection in an MS/MS analysis can be obtained. Accordingly, in normal situations, a mass-to-charge-ratio segment within which there is at least one peak whose signal intensity is equal to or higher than a predetermined threshold can be considered to be significant. It is also possible to accumulate all signal intensities within a mass-to-charge-ratio segment or signal intensities of all peaks located within the mass-to-charge-ratio segment, and consider the mass-to-charge-ratio segment to be significant if the accumulated value is greater than a reference value. Needless to say, even a peak having a high signal intensity should be excluded if it has been previously known that the origin of the peak is a foreign substance or similar component which is contained in the sample yet unnecessary for the measurement.

Thus, in the tandem mass spectrometer according to the present invention, the mass-to-charge-ratio segment determiner may be configured to determine the level of significance of each mass-to-charge-ratio segment based on a signal intensity in a mass spectrum based on the mass spectrum data, and to select a mass-to-charge-ratio segment of high significance combine two or more neighboring mass-to-charge-ratio segments of low significance to form a mass-to-charge-ratio segment having a larger mass-to-charge-ratio width.

As soon as one or more mass-to-charge-ratio segments have been determined based on the mass spectrum data in the previously described manner, the MS/MS analysis controller acquires MS/MS spectrum data over a predetermined mass-to-charge-ratio range for each of the determined mass-to-charge-ratio segments by controlling each relevant section so as to perform an MS/MS analysis in which an ion species included in the determined mass-to-charge-ratio segment is designated as a target. For example, if at least one mass-to-charge-ratio segments which is considered to be significant has been selected in the mass-to-charge-ratio segment determiner, the MS/MS analysis for mass-to-charge-ratio segments within which no ion will be practically observed will be omitted.

Consider a system having a chromatograph (e.g. LC) connected in the previous stage of the tandem mass spectrometer according to the present invention, and suppose that a sample has been insufficiently separated into components in the chromatograph. In normal situations, it is practically impossible for the peaks to be evenly distributed over the entire mass-to-charge-ratio range covered by the measurement. In other words, there should be at least one mass-to-charge-ratio segment within which there is practically no peak observed. Accordingly, the number of times of the execution of the MS/MS analysis will be smaller than in the case where the MS/MS analysis is executed for all mass-to-charge-ratio segments. The number of times of the execution of the MS/MS analysis can also be similarly decreased in the case where two or more mass-to-charge-ratio segments neighboring each other are combined to form a mass-to-charge-ratio segment having a larger mass-to-charge-ratio in the mass-to-charge-ratio segment determiner.

The technique of acquiring MS/MS spectrum data in the tandem mass spectrometer and the program for the same mass spectrometer according to the present invention can be considered as a type of data dependent acquisition. In a conventional type of data dependent acquisition disclosed in Patent Literature 3 or 4 (which is called the "auto MS" analysis" in Patent Literature 4), a precursor ion for the MS/MS analysis is selected for each individual peak on a mass spectrum. If a large number of peaks originating from many components are observed on this mass spectrum, it may be impossible to perform the MS/MS analysis for all peaks. This may result in an omission of the acquisition of MS/MS spectra for some target ions and the lack of necessary information for the identification the like) of a component. By comparison, the tandem mass spectrometer and the program for the same mass spectrometer according to the present invention can collect product-ion information for all peaks observed on a mass spectrum. Such a system is useful for an exhaustive analysis of all components.

The tandem mass spectrometer according to the present invention may further preferably include:

d) a chromatogram creator configured to create an extracted ion chromatogram for each observed ion based on mass spectrum data and MS/MS spectrum data acquired by a repetition of a mass spectrometric analysis performed under the control of the mass spectrometry controller and an MS/MS analysis performed one or more times under the control of the MS/MS analysis controller; and e) an analytical processor configured to classify the observed ion based on retention-time information of a peak on the extracted ion chromatogram created for each ion, and to collect product-ion information corresponding to one component or a precursor ion originating from the component.

One mass-to-charge-ratio segment may possibly include peaks originating from a plurality of components. In that case, product ions originating from the plurality of components will be mixed with each other in an MS/MS spectrum obtained for that mass-to-charge-ratio segment. Even in such a case, those components normally have different retention times in a chromatographic analysis. Therefore, in the extracted ion chromatograms respectively created for the observed ions by the chromatogram creator in the previously described configuration, the peaks of the product ions originating from the same component will appear at roughly the same retention time. Accordingly, the analytical processor classifies each observed ion based on retention-time information of the peak on the extracted ion chromatogram created for that ion, and collects product-ion information corresponding to one component or a precursor ion originating from the component.

Thus, the product-ion information of each component and the corresponding precursor-ion information can be separately obtained from MS/MS spectra in which product ions originating from a plurality of components are mixed with each other. The product-ion information and precursor-ion information obtained in this manner can be used to conduct a database search in an appropriate compound database and identify a component or a precursor ion originating from the component.

Advantageous Effects of Invention

In the tandem mass spectrometer and the program for the same mass spectrometer according to the present invention, even in the case where a large number of ion peaks originating from many components are observed on a mass spectrum acquired by a mass spectrometric analysis, an exhaustive MS/MS analysis for those ion peaks can be performed while reducing the number of times of the execution of the MS/MS analysis. Therefore, in the case of repeatedly performing a measurement cycle which includes a mass spectrometric analysis performed one time and an MS/MS analysis performed one or more times, the length of time of the measurement cycle can be shortened to increase the number of data points per unit time in the extracted ion chromatogram. Consequently, the accuracy of the retention time of the peak in the extracted ion chromatogram will be improved, which enables a correct and reliable gathering of the product ions originating from one component. The shape of the peak in the extracted ion chromatogram will also be improved, which improves the accuracy of the quantitative analysis based on the peak area value. Furthermore, the present invention eliminates the necessity of a forced increase in the speed of the MS/MS analysis itself to shorten the measurement period. This makes it easier to achieve a high level of measurement sensitivity and reproducibility.

BRIEF DESCRIPTION OF DRAWINGS

FIG. 1 is a configuration diagram showing the main components of a tandem mass spectrometer according to one embodiment of the present invention.

FIGS. 4A and 4B are schematic diagrams showing one example of the control sequence in a conventional tandem mass spectrometer.

FIGS. 5A and 5B are diagrams illustrating a process of identifying a precursor ion in a conventional tandem mass spectrometer.

DESCRIPTION OF EMBODIMENTS

Figure 2A:
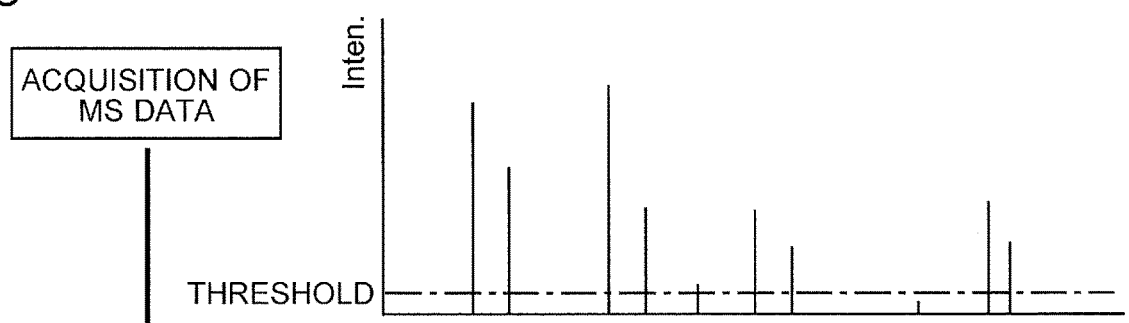
FIGS. 2A and 2B are schematic diagrams showing one example of the control sequence in the tandem mass spectrometer according to the present embodiment.

As one embodiment of the tandem mass spectrometer according to the present invention, a Q-TOF mass spectrometer is hereinafter described with reference to the attached drawings.

FIG. 1 is a schematic configuration diagram showing the main components of the Q-TOF mass spectrometer according to the present embodiment. Though not shown, a liquid chromatograph is connected in the previous stage of this Q-TOF mass spectrometer. A sample containing components which have been temporally separated by the column of the liquid chromatograph is introduced into the Q-TOF mass spectrometer.

The Q-TOF mass spectrometer according to the present embodiment includes a measurement unit 1, data processing unit 3, analysis control unit 4, central control unit 5, input unit 6 and display unit 7.

In the measurement unit 1, a chamber 10 includes an ionization chamber 101 maintained at substantially atmospheric pressure and a second analysis chamber 105 maintained in a high-vacuum state, as well as a first intermediate vacuum chamber 102, second intermediate vacuum chat her 103 and first analysis chat her 104 arranged in ascending order of the degree of vacuum from the ionization chamber 101 to the second analysis chamber 105. That is to say, the measurement unit 1 has the configuration of a multistage differential pumping system.

In the ionization chamber 101, an ESI spray 11 for ionizing a sample by electrospray ionization (ESI) is provided as an ion source. The inside of the ionization chamber 101 communicates with that of the first intermediate vacuum chamber 102 through a heated desolvation tube 12. The first intermediate vacuum chamber 102 and the second intermediate vacuum chamber 103 respectively contain ion guides 13 and 15 for transporting ions to the subsequent stage while converging those ions. The first intermediate vacuum chamber 102 communicates with the second intermediate vacuum chamber 103 through a small hole formed at the apex of a skimmer 14.

The first analysis chamber 104 contains a quadrupole mass filter 16 as the first mass-separating section and a collision cell 17 containing a multipole ion guide 18. The second analysis chamber 105 contains an orthogonal acceleration reflectron time-of-flight mass analyzer as the second mass-separating section and an ion detector 24. The orthogonal acceleration reflectron time-of-flight mass analyzer includes an orthogonal accelerator 21, flight space 22 and reflector 23. An ion guide 19 is located between the collision cell 17 and the orthogonal accelerator 21. An ion-passage hole 20, which is formed in the watt separating the first analysis chamber 104 and the second analysis chamber 105, is sandwiched in the ion guide 19.

The analysis control unit 4 includes an MS analysis controller 40 and an MS/MS analysis controller 41. This unit is responsible for controlling the operation of each section in the measurement unit 1. The data processing unit 3 receives detection signals from the ion detector 24. This unit includes a data collector 30, mass spectrum creator 31, mass spectrum analyzer 32, judgment condition storage section 33, chromatogram creator 34 and identification processor 35 as its functional blocks. The central control unit 5 is responsible for the general control of the entire system as well as the user interface.

Typically, the data processing unit 3, analysis control unit 4 and central control unit 5 are actually a personal computer (or workstation), in which case the functions by the aforementioned functional blocks can be realized by executing, on the computer, dedicated controlling-processing software installed on the same computer. Such dedicated controlling-processing software corresponds to the program for a tandem mass spectrometer according to the present invention.

The operation in the measurement unit 1 during a typical MS/MS analysis is hereinafter schematically described.

An eluate from the column of the liquid chromatograph (not shown) is introduced into the ESI spray 11. The ESI spray 11 sprays the eluate while imparting imbalanced electric charges to the eluate. The electrically charged droplets come in contact with atmospheric gas within the ionization chamber 101 and are broken into finer droplets, causing the solvent to turn into vapor. During this process, the components in the droplets are ionized. The generated ions are introduced through the desolvation tube 12 as well as the ion guide 13 and 15 into the quadrupole mass filter 16. Under the control of the analysis control unit 4, voltages which allow only an ion having a specific mass-to-charge ratio or ions having a specific mass-to-charge-ratio width to pass through the quadrupole mass filter 16 are applied to the same mass filter. Thus, among the various ions originating from the sample components, only an ion having a specific mass-to-charge ratio or ions having a specific mass-to-charge-ratio width is selectively allowed to pass through the quadrupole mass filter 16 as a precursor ion and be introduced into the collision cell 17.

Meanwhile, a predetermined kind of collision gas (e.g. helium or argon) is introduced into the collision cell 17. Upon coming in contact with this collision gas, the precursor ion is dissociated, and various kinds of product ions are generated. The generated product ions are sent through the ion guide 19 into the orthogonal accelerator 21. The orthogonal accelerator 21 accelerates the ion stream in a direction substantially orthogonal to the stream at predetermined intervals of time to eject the ions into the flight space 22. The ejected ions are returned by an electric field created by the reflector 23 and eventually reach the ion detector 24.

Ions which have begun their flight at the same point in time are separated from each other according to their mass-to-charge ratios during their flight and sequentially arrive at the ion detector 24 in ascending order of mass-to-charge ratio. Accordingly, in the data processing unit 3, a time-of-flight spectrum showing the relationship between the time of flight and signal intensity of the ions can be obtained, with the point in time of the acceleration of the ions in the orthogonal accelerator 21 (i.e. the point in time of the beginning of the flight of the ions) defined as a time-of-flight value of zero. Based on a previously determined relationship between the mass-to-charge ratio and time of flight, the time-of-flight values can be converted into mass-to-charge ratios. Thus, a mass spectrum (MS/MS spectrum) can be obtained from the time-of-flight spectrum. A mass spectrum over a predetermined mass-to-charge-ratio range of can be obtained for each execution of the pulsed acceleration of the ions in the orthogonal accelerator 21.

When a normal mass spectrometric analysis with no dissociation of ions is performed, the selection of an ion in the quadrupole mass filter 16 is omitted; i.e., all ions are allowed to directly pass through. Additionally, the dissociation of an ion is suppressed by stopping the introduction of the collision gas into the collision cell 17 or the supply of the collision energy required for the dissociation to the ions. Under these conditions, ions having a wide range of mass-to-charge ratios originating from sample components are introduced into the orthogonal accelerator 21 and subjected to the mass spectrometric analysis.

A first technique for the component identification using the MS/MS analysis operation characteristic of the Q-TOF mass spectrometer according to the present embodiment is hereinafter described with reference to FIGS. 2A and 2B.

In advance of an analysis using the Q-TOF mass spectrometer according to the present embodiment, an operator using the input unit 6 sets the mass-to-charge-ratio width $\Delta M$ of the precursor ion as the target of the MS/MS analysis and the judgment conditions for the selection of the mass-to-charge-ratio segments for which the MS/MS analysis is to be performed. The information of the mass-to-charge-ratio width $\Delta M$ is stored in the judgment condition storage section 33 and is also sent to the MS/MS analysis controller 41. The judgment conditions are stored in the judgment condition storage section 33. Needless to say, the default setting of the information prepared in the device may be used, in which case the operator does not need to input those pieces of information. As one example, it is hereinafter assumed a threshold for the accumulated value of the signal intensity within the mass-to-charge-ratio segment is set as the judgment condition.

In the Q-TOF mass spectrometer according to the present embodiment, similar to the conventional tandem mass spectrometer described earlier, one measurement cycle which includes a normal mass spectrometric analysis performed one time and an MS/MS analysis performed one or more times is repeated to collect mass spectrum data and MS/MS spectrum data. A difference from the conventional device exists in that the number of times of the MS/MS analysis to be performed within one measurement cycle is not fixed in the Q-TOF mass spectrometer according to the present embodiment; the number of times depends on the mass spectrum data obtained through the normal mass spectrometric analysis in the measurement cycle. Accordingly, the length of time of one measurement cycle is also variable and not fixed.

That is to say, in each measurement cycle, the MS analysis controller 40 initially controls each section in the measurement unit 1 to perform a normal mass spectrometric analysis with no dissociation of ions. A set of data which forms a mass spectrum over a predetermined mass-to-charge-ratio range as shown in FIG. 2A is thereby obtained. This set of data is stored in the data collector 30. As soon as the mass spectrum data has been collected, the mass spectrum creator 31 creates a mass spectrum based on the data.

Subsequently, based on the information of the mass-to-charge-ratio width ΔM stored in the judgment condition storage section 33, the mass spectrum analyzer 32 determines the mass-to-charge-ratio segments by dividing the entire mass-to-charge-ratio range to be covered by the measurement by the mass-to-charge-ratio width ΔM, and calculates the accumulated value of the signal intensity on the mass spectrum for each mass-to-charge-ratio segment. A mass-to-charge-ratio segment with a large number of relatively high peaks will have a large accumulated value of the signal intensity, while a mass-to-charge-ratio segment with no noticeable peak will conversely have a small accumulated value of the signal intensity. For each mass-to-charge-ratio segment, the mass spectrum analyzer 32 determines whether or not the accumulated signal-intensity value calculated for the segment concerned is equal to or greater than the threshold stored as the judgment condition in the judgment condition storage section 33. The mass spectrum analyzer 32 selects each mass-to-charge-ratio segment having an accumulated signal-intensity value equal to or greater than the threshold as a significant mass-to-charge ratio segment. The result of the selection is sent to the MS/MS analysis controller 41.

Figure 2B:
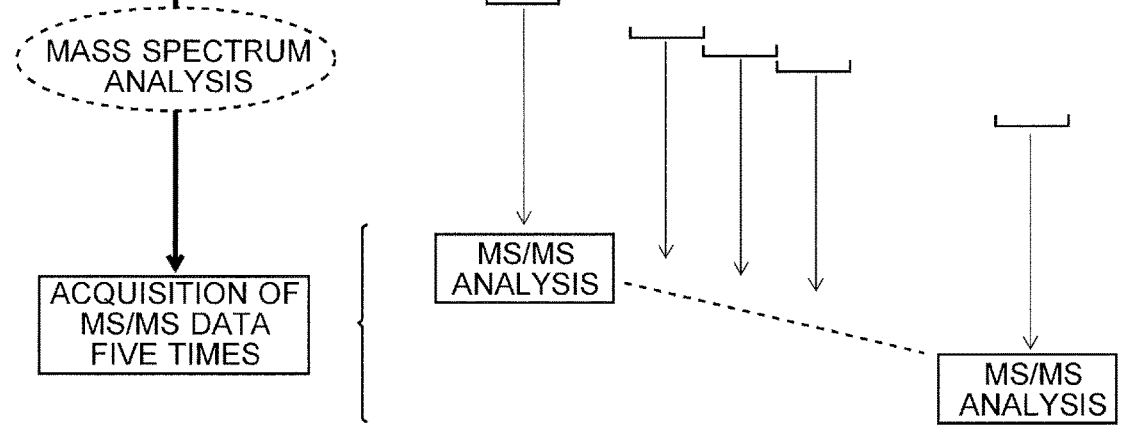

In the example shown in FIGS. 2A and 2B, similar to FIGS. 4A and 4B, the entire mass-to-charge-ratio range covered by the measurement is divided into ten mass-to-charge-ratio segments. However, only five segments are selected as the significant mass-to-charge ratio segments. The MS/MS analysis controller 41 controls the operation of each section in the measurement unit 1 so as to perform an MS/MS analysis only for each of the selected mass-to-charge-ratio segments in such a manner that all ions whose mass-to-charge ratios fall within the mass-to-charge-ratio segment concerned are designated as precursor ions. Accordingly, in the example of FIGS. 2A and 2B, a normal mass spectrometric analysis performed one time is followed by an MS/MS analysis performed five times within each measurement cycle, and a set of data forming an MS/MS spectrum is stored in the data collector 30 for each execution of the MS/MS analysis.

The length of time required for one measurement cycle is sufficiently shorter than the period of time during which a sample containing one specific component is being introduced into the measurement unit 1. Therefore, it is possible to consider that the component in the sample subjected to the measurement in the normal mass spectrometric analysis is identical to the one subjected to the measurement in the MS/MS analysis within one measurement cycle. This means that the ions observed on the MS/MS spectra obtained by the MS/MS analysis are product ions generated through the dissociation of the ions observed on the mass spectrum obtained in the same measurement cycle. Meanwhile, there is practically no ion within the mass-to-charge-ratio segments which have not been selected in the mass spectrum analyzer 32. Therefore, there is practically no lack of product-ion information due to the omission of the MS/MS analysis for those mass-to-charge-ratio segments. Accordingly, although the number of times of the execution of the MS/MS analysis within one measurement cycle is smaller than in the conventional device, the obtained product-ion information is practically equal to the information which would be obtained if the MS/MS analysis were performed for all mass-to-charge-ratio segments.

Through the previously described controlling and processing operation performed in each measurement cycle, mass spectrum data and MS/MS spectrum data are collected. After the completion of the entire measurement, the chromatogram creator 34 creates an extracted ion chromatogram for each of the precursor and product ions having the same mass-to-charge ratio based on the collected mass spectrum data and MS/MS spectrum data. The identification processor 35 gathers the precursor ion and product ions having the same retention time, as shown in the already described FIG. 5B, and identifies the component by conducting a database search using the mass-to-charge ratios of those ions. Even if product ions originating from a plurality of components are mixed with each other in one MS/MS spectrum, those product ions can be separated for each component by their retention times. Therefore, the product-ion information (mass-to-charge-ratio values) for each component can be correctly and reliably collected.

Decreasing the number of times of the execution of the MS/MS analysis within one measurement cycle shortens the period of time required for one measurement cycle and thereby increases the number of data points per unit time in the extracted ion chromatogram. This improves the accuracy of the shape of the waveform of the extracted ion chromatogram, which in turn improves the accuracy of the calculation of the retention time and enables a correct and reliable gathering of the product ions originating from the same component. Thus, the accuracy of the component identification is also improved. The improved accuracy of the shape of the waveform of the extracted ion chromatogram also enhances the accuracy of the quantitative value in a quantitative analysis of a component which has been identified based on the area value of the peak in the extracted ion chromatogram.

A second technique for the component identification using the MS/MS analysis operation characteristic of the Q-TOF mass spectrometer according to the present embodiment is hereinafter described with reference to FIGS. 3A and 3B.

In the present case, after a set of normal mass spectrum data has been obtained, the mass spectrum analyzer 32 operates in a similar manner as in the first technique: Based on the information of the mass-to-charge-ratio width ΔM stored in the judgment condition storage section 33, the mass spectrum analyzer 32 determines the mass-to-charge-ratio segments by dividing the entire mass-to-charge-ratio range to be covered by the measurement by the mass-to-charge-ratio width ΔM, and calculates the accumulated value of the signal intensity on the mass spectrum for each mass-to-charge-ratio segment. Subsequently, for each mass-to-charge-ratio segment, the mass spectrum analyzer 32 determines whether or not the accumulated signal-intensity value calculated for the segment concerned is equal to or greater than the threshold stored as the judgment condition in the judgment condition storage section 33. If the accumulated signal-intensity value is equal to or greater than the threshold, the mass-to-charge-ratio segment concerned is directly selected as a significant mass-to-charge-ratio segment. By comparison, if the accumulated signal-intensity value is less than the threshold, the mass-to-charge-ratio segment concerned is integrated with a neighboring mass-to-charge-ratio segment (i.e. a segment with continued mass-to-charge-ratio values) to form a new mass-to-charge-ratio segment having a larger mass-to-charge-ratio width, provided that the accumulated signal-intensity value of that neighboring mass-to-charge-ratio segment is also less than the threshold. If the accumulated signal-intensity values of the neighboring mass-to-charge-ratio segments on both sides are equal to or greater than the threshold, the integration of the segments mentioned earlier is not performed, and the mass-to-charge-ratio segment having the accumulated signal-intensity value less than the threshold is also directly selected.

Figure 3A:
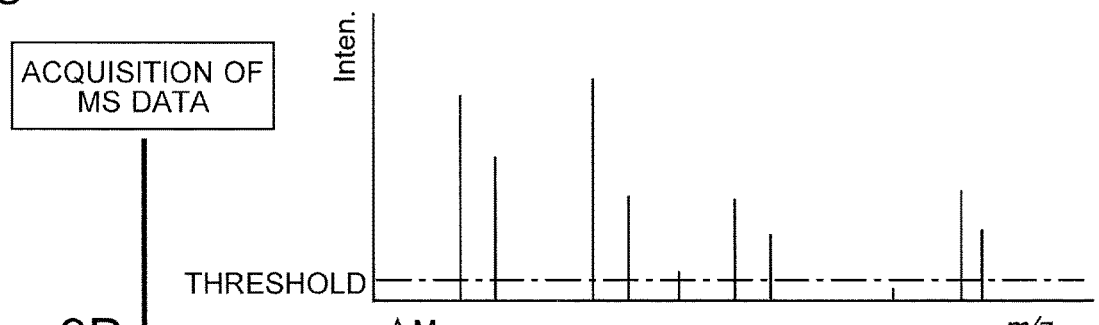
FIGS. 3A and 3B are schematic diagrams showing another example of the control sequence in the tandem mass spectrometer according to the present embodiment.
Figure 3B:
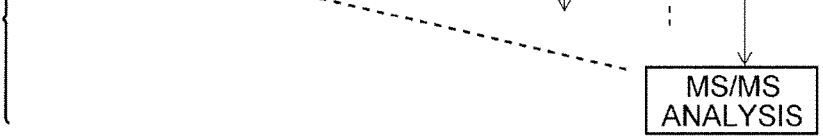

In the example shown in FIGS. 3A and 3B, as in FIGS. 2A and 2B or 4A and 4B, the entire mass-to-charge-ratio range covered by the measurement is divided into ten mass-to-charge-ratio segments. Through the previously described integration process, the number of mass-to-charge-ratio segments decreases from ten to nine. Accordingly, in the present case, the normal mass spectrometric analysis performed one time is followed by the MS/MS analysis performed nine times within one measurement cycle. The amount of decrease in the number of times of the execution of the MS/MS analysis in the second technique is normally smaller than in the first technique, and the effect of shortening the measurement cycle is accordingly lower. However, the second technique has the advantage that there is no segment in which the MS/MS analysis is omitted within the entire mass-to-charge-ratio range covered by the measurement, so that product-ion information originating from a low peak observed on the mass spectrum can also be assuredly collected.

The device may be configured to allow the operator to select either the first technique or second technique on the input unit 6. The choices for the operator do not need to be limited to the first and second techniques; the choices may additionally include a conventional method in which the MS/MS analysis is performed for all mass-to-charge-ratio segments defined by dividing the entire mass-to-charge-ratio range by the predetermined mass-to-charge-ratio width regardless of the content of the mass spectrum data.

The first and second techniques can be combined. For example, the judgment conditions can be set in a two-stage form for a process including a first stage in which any mass-to-charge-ratio segment that does not satisfy the judgment condition for the first stage is excluded from the MS/MS analysis, and a second stage in which mass-to-charge-ratio segments neighboring each other are integrated into one segment if none of those segments satisfy the judgment condition for the second stage.

Although the previous embodiment is concerned with the case where the present invention is applied to a Q-TOF mass spectrometer, it is evident that the present invention is also applicable to various types of mass spectrometers capable of an MS/MS analysis, such as a triple quadrupole mass spectrometer, TOF/TOF mass spectrometer, as well as an ion trap mass spectrometer or ion trap time-of-flight mass spectrometer.

It should also be noted that the previous embodiment and its variations are all mere examples of the present invention, and any change, addition or modification appropriately made within the spirit of the present invention in any aspect other than those already described will evidently fall within the scope of claims of the present application.

REFERENCE SIGNS LIST

1 . . . Measurement Unit
10 . . . Chamber
101 . . . Ionization Chamber
102 . . . First Intermediate Vacuum Chamber
103 . . . Second Intermediate Vacuum Chamber
104 . . . First Analysis Chamber
105 . . . Second Analysis Chamber
11 . . . ESI Spray
12 . . . Desolvation Tube
13 . . . Ion Guide
14 . . . Skimmer
16 . . . Quadrupole Mass Filter
17 . . . Collision Cell
18 . . . Multipole ion Guide
19 . . . Ion Guide
20 . . . Ion-Passage Hole
21 . . . Orthogonal Accelerator
22 . . . Flight Space
23 . . . Reflector
24 . . . Ion Detector
3 . . . Data Processing Unit
30 . . . Data Collector
31 . . . Mass Spectrum Creator
32 . . . Mass Spectrum Analyzer
33 . . . Judgment Condition Storage Section
34 . . . Chromatogram Creator
35 . . . Identification Processor
4 . . . Analysis Control Unit
40 . . . MS Analysis Controller
41 . . . MS/MS Analysis Controller
5 . . . Central Control Unit
6 . . . Input Unit
7 . . . Display Unit

The invention claimed is:

1. A tandem mass spectrometer including a first mass-separating section configured to select, as a precursor ion, an ion having a specific mass-to-charge ratio or ions having a specific mass-to-charge-ratio range among ions originating from a sample, an ion-dissociating section configured to dissociate the precursor ion, and a second mass-separating section configured to perform a mass spectrometric analysis for various product ions generated by dissociation of the precursor ion, the tandem mass spectrometer comprising:
   a) a mass spectrometry controller configured to control each of the aforementioned sections so as to acquire mass spectrum data by performing a mass spectrometric analysis in the second mass-separating section, without performing selection of an ion in the first mass-separating section and dissociation of an ion in the ion-dissociating section;
   b) a mass-to-charge-ratio segment determiner configured to select one or more mass-to-charge-ratio segments from a plurality of mass-to-charge-ratio segments obtained by dividing an entire mass-to-charge-ratio range covered by a measurement by a predetermined mass-to-charge-ratio width, and/or to combine two or more mass-to-charge-ratio segments neighboring each other among the plurality of mass-to-charge-ratio segments to form a mass-to-charge-ratio segment having a larger mass-to-charge-ratio width, based on mass spectrum data obtained under a control of the mass spectrometry controller, wherein the mass-to-charge-ratio segment determiner is further configured to determine a level of significance of each mass-to-charge-ratio segment based on a signal intensity in a mass spectrum based on the mass spectrum data, and to select a mass-to-charge-ratio segment of high significance or combine two or more neighboring mass-to-charge-ratio segments of low significance to form a mass-to-charge-ratio segment having a larger mass-to-charge-ratio width; and c) an MS/MS analysis controller configured to control each of the aforementioned sections after acquisition of the mass spectrum data under the control of the mass spectrometry controller and determination of the one or more mass-to-charge-ratio segments by the mass-to-charge-ratio segment determiner, so as to acquire MS/MS spectrum data for each of the determined mass-to-charge-ratio segment or segments by performing a mass spectrometric analysis in the second mass-separating section after selecting an ion whose mass-to-charge ratio falls within the mass-to-charge-ratio segment in the first mass-separating section and dissociating the selected ion in the ion-dissociating section.

2. The tandem mass spectrometer according to claim 1, further comprising:

d) a chromatogram creator configured to create an extracted ion chromatogram for each observed ion based on mass spectrum data and MS/MS spectrum data acquired by a repetition of a mass spectrometric analysis performed under the control of the mass spectrometry controller and an MS/MS analysis performed one or more times under a control of the MS/MS analysis controller; and e) an analytical processor configured to classify the observed ion based on retention-time information of a peak on the extracted ion chromatogram created for each ion, and to collect product-ion information corresponding to one component or a precursor ion originating from the component.

3. A non-transitory computer-readable medium recording a program for a computer for controlling an operation of a tandem mass spectrometer including a first mass-separating section configured to select, as a precursor ion, an ion having a specific mass-to-charge ratio or ions having a specific mass-to-charge-ratio range among ions originating from a sample, an ion-dissociating section configured to dissociate the precursor ion, and a second mass-separating section configured to perform a mass spectrometric analysis for various product ions generated by dissociation of the precursor ion, wherein the program is configured to make the computer function as:

a) a mass spectrometry control functional unit configured to control each of the aforementioned sections so as to acquire mass spectrum data by performing a mass spectrometric analysis in the second mass-separating section, without performing selection of an ion in the first mass-separating section and dissociation of an ion in the ion-dissociating section;

b) a mass-to-charge-ratio segment determination functional unit configured to select one or more mass-to-charge-ratio segments from a plurality of mass-to-charge-ratio segments obtained by dividing an entire mass-to-charge-ratio range covered by a measurement by a predetermined mass-to-charge-ratio width, and/or to combine two or more mass-to-charge-ratio segments neighboring each other among the plurality of mass-to-charge-ratio segments to form a mass-to-charge-ratio segment having a larger mass-to-charge-ratio width, based on mass spectrum data obtained under a control of the mass spectrometry control functional unit, wherein the mass-to-charge-ratio segment determination functional unit is further configured to determine a level of significance of each mass-to-charge-ratio segment based on a signal intensity in a mass spectrum based on the mass spectrum data, and to select a mass-to-charge-ratio segment of high significance or combine two or more neighboring mass-to-charge-ratio segments of low significance to form a mass-to-charge-ratio segment having a larger mass-to-charge-ratio width; and c) an MS/MS analysis control functional unit configured to control each of the aforementioned sections after acquisition of the mass spectrum data under the control of the mass spectrometry control functional unit and determination of the one or more mass-to-charge-ratio segments by the mass-to-charge-ratio segment determination functional unit, so as to acquire MS/MS spectrum data for each of the determined mass-to-charge-ratio segment or segments by performing a mass spectrometric analysis in the second mass-separating section after selecting an ion whose mass-to-charge ratio falls within the mass-to-charge-ratio segment in the first mass-separating section and dissociating the selected ion in the ion-dissociating section.

* * * * *